US011665674B2

(12) United States Patent
Li et al.

(10) Patent No.: US 11,665,674 B2
(45) Date of Patent: May 30, 2023

(54) DIRECT LINK DATA TRANSMISSION METHOD, TERMINAL DEVICE, AND NETWORK DEVICE

(71) Applicant: HUAWEI TECHNOLOGIES CO., LTD., Guangdong (CN)

(72) Inventors: Mingchao Li, Beijing (CN); Hang Liu, Beijing (CN); Hejun Wang, Shenzhen (CN); Xiao Xiao, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 416 days.

(21) Appl. No.: 16/831,048

(22) Filed: Mar. 26, 2020

(65) Prior Publication Data
US 2020/0229150 A1 Jul. 16, 2020

Related U.S. Application Data

(63) Continuation of application No. PCT/CN2017/103759, filed on Sep. 27, 2017.

(51) Int. Cl.
*H04W 72/04* (2023.01)
*H04W 76/14* (2018.01)
*H04W 72/12* (2023.01)

(52) U.S. Cl.
CPC .......... *H04W 72/04* (2013.01); *H04W 72/12* (2013.01); *H04W 76/14* (2018.02)

(58) Field of Classification Search
CPC ...... H04W 72/04; H04W 76/14; H04W 72/12
See application file for complete search history.

(56) References Cited

U.S. PATENT DOCUMENTS

2017/0150490 A1 5/2017 Chen et al.
2017/0215098 A1 7/2017 Huang et al.
(Continued)

FOREIGN PATENT DOCUMENTS

CN 103843444 A 6/2014
CN 105338639 A 2/2016
(Continued)

OTHER PUBLICATIONS

Intel Corporation: "Sharing Resource Pool for eNB-Controll ed and UE-Autonomous V2V Transmission Modes", 3GPP Draft; R1-1712491—Aug. 20, 2017 (Aug. 20, 2017), XP051315307,total 6 pages.
(Continued)

*Primary Examiner* — Rhonda L Murphy
(74) *Attorney, Agent, or Firm* — Womble Bond Dickinson (US) LLP

(57) ABSTRACT

This application provides a direct link data transmission method, a terminal device, and a network device. The method includes: receiving, by a first terminal device, first configuration information sent by a network device, where the first configuration information includes information about a transmission resource set, and the transmission resource set is a transmission resource set shared between a second terminal device that uses a centralized scheduling transmission mode and a third terminal device that uses a distributed transmission mode; detecting, by the first terminal device, a load level of a resource unit in the transmission resource set based on the information about the transmission resource set; and sending, by the first terminal device, report information to the network device based on the load level, where the report information includes information about an occupied resource unit and/or information about an available resource unit in the transmission resource set. A transmis-
(Continued)

sion resource allocated to the first terminal device can be prevented from colliding with a transmission resource of another terminal device, so that communication quality of a terminal device and user experience is improved.

20 Claims, 7 Drawing Sheets

(56) References Cited

U.S. PATENT DOCUMENTS

2017/0215170 A1 7/2017 Islam et al.
2020/0383088 A1* 12/2020 Min .................... H04W 72/042

FOREIGN PATENT DOCUMENTS

| | | |
|---|---|---|
| CN | 106454956 A | 2/2017 |
| CN | 106488478 A | 3/2017 |
| CN | 107005985 A | 8/2017 |
| WO | 2011069295 A1 | 6/2011 |

OTHER PUBLICATIONS

Ericsson: "Radio resource pool sharing between mode 3 and mode 4 UEs",3GPP Draft; R1-1708942,May 6, 2017 (May 6, 2017), XP051262781,total 4 pages.
Samsung: "Supporting reliability during resource sharing",3GPP Draft; R2-1709430,Aug. 20, 2017 (Aug. 20, 2017), XP051319158,total 2 pages.
CATT: "Discussion on resource pool sharing between mode 3 and mode 4",3GPP Draft; R1-1707450,May 6, 2017 (May 6, 2017)9 XP0512617989,total 4 pages.

* cited by examiner

DIRECT LINK DATA TRANSMISSION METHOD, TERMINAL DEVICE, AND NETWORK DEVICE

CROSS-REFERENCE TO RELATED APPLICATIONS

This application is a continuation of International Application No. PCT/CN2017/103759, filed on Sep. 27, 2017. The disclosure of which is herein incorporated by reference in its entirety.

TECHNICAL FIELD

This application relates to the communications field, and more specifically, to a direct link data transmission method, a terminal device, and a network device in the communications field.

BACKGROUND

A vehicle may obtain road condition information or receive an information service in time through vehicle to vehicle (V2V) communication or vehicle to infrastructure (V2I) communication or vehicle to pedestrian (V2P) communication or vehicle to network (V2N) communication, which may be collectively referred to as V2X communication (X stands for anything). A network used by the V2X communication is referred to as an Internet of Vehicles. Direct link data transmission is mainly a process of data transmission or information exchange between two terminal devices, and the Internet of Vehicles is an important part of the direct link communication at present.

At present, direct link communication based on a long term evolution (LTE) system is mainly divided into two transmission modes. One is a centralized scheduling transmission mode. In this mode, before sending data each time, a transmit end device needs to request a transmission resource from a base station, and sends direct link communication service data based on the transmission resource allocated by the base station. The other is a distributed transmission mode. In this mode, a transmit end device can obtain configuration of a transmission resource pool in advance. When the transmit end device needs to send direct link communication data, the transmit end device can independently select a transmission resource in the pre-obtained transmission resource pool and transmit the data.

Usually, a transmission resource pool of the distributed transmission mode and a transmission resource pool of the centralized scheduling transmission mode are orthogonal and planned by a network. However, this static division results in relatively low resource utilization. Therefore, a distributed transmission resource pool and a centralized scheduling resource pool are allowed to be non-orthogonal. That is, some transmission resources (even all transmission resources) in the two types of resource pools may overlap. A resource in an overlapping part may be used through the distributed transmission mode, or may be used through the centralized scheduling transmission mode. When the distributed transmission resource pool and the centralized scheduling resource pool are allowed to overlap, for a resource in an overlapping part, it is possible that terminal devices using different transmission modes occupy a same transmission resource, and this may cause a transmission collision. Consequently, data sent by the terminal devices using different transmission modes and a same transmission resource causes mutual interference, and this makes a receive end device fail to receive data correctly. Therefore, communication quality of a user is affected, and user experience is poor.

SUMMARY

This application provides a direct link data transmission method, a terminal device, and a network device. When a distributed transmission resource set overlaps a centralized scheduling resource pool, the terminal device may detect a resource unit in the transmission resource set and send information about an idle or available resource unit in the transmission resource set to the network device, so that a transmission resource allocated to the first terminal device can be prevented from colliding with a transmission resource of another terminal device, thereby improving communication quality and user experience.

According to a first aspect, a direct link data transmission method is provided, including: receiving, by a first terminal device, first configuration information sent by a network device, where the first configuration information includes information about a transmission resource set, and the transmission resource set is a transmission resource set shared between a second terminal device that uses a centralized scheduling transmission mode and a third terminal device that uses a distributed transmission mode; detecting, by the first terminal device, a load level of a resource unit in the transmission resource set based on the information about the transmission resource set; and sending, by the first terminal device, report information to the network device based on the load level, where the report information includes information about an occupied resource unit and/or information about an available resource unit in the transmission resource set.

According to the direct link data transmission method of the first aspect, when the distributed transmission resource set overlaps the centralized scheduling resource pool, the network device may send configuration information of the transmission resource set (an overlapping resource pool) to a first terminal device that needs to request a transmission resource. The first terminal device may detect a resource unit in the transmission resource set, determine usage of the transmission set, and send information about an idle or available resource unit in the transmission resource set to the network device. The network device allocates the transmission resource to the first terminal device based on the information about the resource unit. In this way, the transmission resource allocated to the first terminal device can be prevented from colliding with a transmission resource of another terminal device. It is ensured that the first terminal device can communicate smoothly, thereby improving communication quality and user experience.

In one embodiment, the first configuration information further includes a first threshold and/or a second threshold, where the first threshold is less than or equal to the second threshold, and before the sending, by the first terminal device, report information to the network device, the method further includes: determining, by the first terminal device, to send the report information to the network device when the load level is greater than or equal to the first threshold; or, determining, by the first terminal device, to send the report information to the network device when the load level is greater than or equal to the first threshold and is less than or equal to the second threshold; or determining, by the first terminal device, to send the report information to the network device when the load level is less than or equal to the second threshold.

In one embodiment, the load level includes: a load level of a resource unit used by the third terminal device in the transmission resource set; or, a load level of a resource unit used by the second terminal device and the third terminal device in the transmission resource set.

In one embodiment, the first configuration information further includes a third threshold M and/or a fourth threshold T, where M is less than or equal to T, and the method further includes: determining, by the first terminal device, K available resource units in the transmission resource set, where K is less than or equal to M; or determining, by the first terminal device, K available resource units in the transmission resource set, where K is greater than or equal to T; or determining, by the first terminal device, K available resource units in the transmission resource set, where K is greater than or equal to M and is less than or equal to T; and the information about the available resource unit in the report information is information about the K available resource units.

In one embodiment, before the detecting, by the first terminal device, a load level of a resource unit in the transmission resource set, the method further includes: receiving, by the first terminal device, second configuration information sent by the network device, where the second configuration information includes a fifth threshold and/or a sixth threshold, and the fifth threshold is less than or equal to the sixth threshold; and the detecting, by the first terminal device, a load level of a resource unit in the transmission resource set based on the information about the transmission resource set includes: determining, by the first terminal device, to start to detect the load level when signal quality of the network device detected by the first terminal device is less than or equal to the fifth threshold, or determining, by the first terminal device, to start to detect the load level when signal quality of the network device detected by the first terminal device is greater than or equal to the sixth threshold, or determining, by the first terminal device, to start to detect the load level when signal quality of the network device detected by the first terminal device is greater than or equal to the fifth threshold and is less than or equal to the sixth threshold.

In one embodiment, the first terminal device uses the centralized scheduling transmission mode or uses the distributed transmission mode.

In one embodiment, after the sending, by the first terminal device, report information to the network device, the method further includes: receiving, by the first terminal device, resource scheduling information sent by the network device, where the resource scheduling information is generated based on the report information, and the resource scheduling information includes resource unit information in the transmission resource set allocated to the first terminal device.

According to a second aspect, a direct link data transmission method is provided, including: sending, by a network device, first configuration information to a first terminal device, where the first configuration information includes information about a transmission resource set, and the transmission resource set is a transmission resource set shared between a second terminal device that uses a centralized scheduling transmission mode and a third terminal device that uses a distributed transmission mode; and receiving, by the network device, report information sent by the first terminal device, where the report information includes information about an occupied resource unit and/or information about an available resource unit in the transmission resource set.

According to the direct link data transmission method of the second aspect, when the distributed transmission resource set overlaps the centralized scheduling resource pool, the network device may send configuration information of the transmission resource set (an overlapping resource pool) to a terminal device that needs to request a transmission resource. The terminal device may detect a resource unit in the transmission resource set, determine usage of the transmission resource set, and send information about an idle or available resource unit in the transmission resource set to the network device. The network device allocates the transmission resource to the terminal device based on the information about the resource unit. In this way, the transmission resource allocated to the terminal device can be prevented from colliding with a transmission resource independently selected by a terminal device that uses a distributed transmission mode. It is ensured that the terminal device can communicate smoothly, thereby improving communication quality and user experience.

In one embodiment, the first configuration information further includes a first threshold and/or a second threshold, where the first threshold is less than or equal to the second threshold, and the first threshold and/or the second threshold are/is used for the first terminal device to determine to send the report information to the network device based on a load level of the transmission resource set.

In one embodiment, the first configuration information further includes a third threshold M and/or a fourth threshold T, where M is less than or equal to T, and the information about the available resource unit in the report information is information about K available resource units, where K is less than or equal to M, or K is greater than or equal to T, or K is greater than or equal to M and is less than or equal to T.

In one embodiment, the method further includes: sending, by the network device, second configuration information to the first terminal device, where the second configuration information includes a fifth threshold and/or a sixth threshold, the fifth threshold is less than or equal to the sixth threshold; and the fifth threshold and/or the sixth threshold are/is used for the first terminal device to determine to start to detect the load level of the transmission resource set.

In one embodiment, the load level includes: a load level of a resource unit used by the third terminal device in the transmission resource set; or, a load level of a resource unit used by the second terminal device and third terminal device in the transmission resource set.

In one embodiment, the first terminal device uses the centralized scheduling transmission mode or uses the distributed transmission mode.

In one embodiment, after the receiving, by the network device, report information sent by the first terminal device, the method further includes: sending, by the network device, resource scheduling information to the first terminal device, where the resource scheduling information is generated based on the report information, and the resource scheduling information includes resource unit information in the transmission resource set allocated to the first terminal device.

According to a third aspect, a terminal device is provided. The terminal device includes a processor, a memory, and a transceiver that are configured to support the terminal device in executing corresponding functions in the foregoing methods. The processor, the memory, and the transceiver are connected through communication, where the memory stores an instruction, the transceiver is configured to perform specific signal receiving/transmission under driving of the processor, and the processor is configured to invoke the instruction to implement the direct link data transmission method according to the first aspect and the implementations of the first aspect.

According to a fourth aspect, a terminal device is provided. The terminal device includes a processing module, a storage module, and a transceiver module that are configured to support the terminal device in executing a function of the first terminal device according to the first aspect or any possible implementation of the first aspect. The function may be implemented by using hardware, or may be implemented by hardware by executing corresponding software. The hardware or the software includes one or more modules corresponding to the foregoing function.

According to a fifth aspect, a network device is provided. The network device includes a processor, a memory, and a transceiver that are configured to support the network device in executing corresponding functions in the foregoing methods. The processor, the memory, and the transceiver are connected through communication, where the memory stores an instruction, the transceiver is configured to perform specific signal receiving/transmission under driving of the processor, and the processor is configured to invoke the instruction to implement the direct link data transmission method according to the second aspect and the implementations of the second aspect.

According to a sixth aspect, a network device is provided. The network device includes a processing module, a storage module, and a transceiver module that are configured to support the network device in executing a function of the network device according to the second aspect or any possible implementation of the second aspect. The function may be implemented by using hardware, or may be implemented by hardware by executing corresponding software. The hardware or the software includes one or more modules corresponding to the foregoing function.

According to a seventh aspect, a communications system is provided. The communications system includes the terminal device according to the third aspect or the fourth aspect and the network device according to the fifth aspect or the sixth aspect. The communications system may complete the direct link data transmission methods according to the first aspect and the second aspect.

According to an eighth aspect, a computer readable storage medium is provided. The computer readable storage medium is configured to store a computer program, where the computer program includes an instruction used to perform the method according to the first aspect or any possible implementation of the first aspect.

According to a ninth aspect, a computer readable storage medium is provided. The computer readable storage medium is configured to store a computer program, where the computer program includes an instruction, configured to perform the method according to the second aspect or any possible implementation of the second aspect.

DESCRIPTION OF EMBODIMENTS

Figure 1:
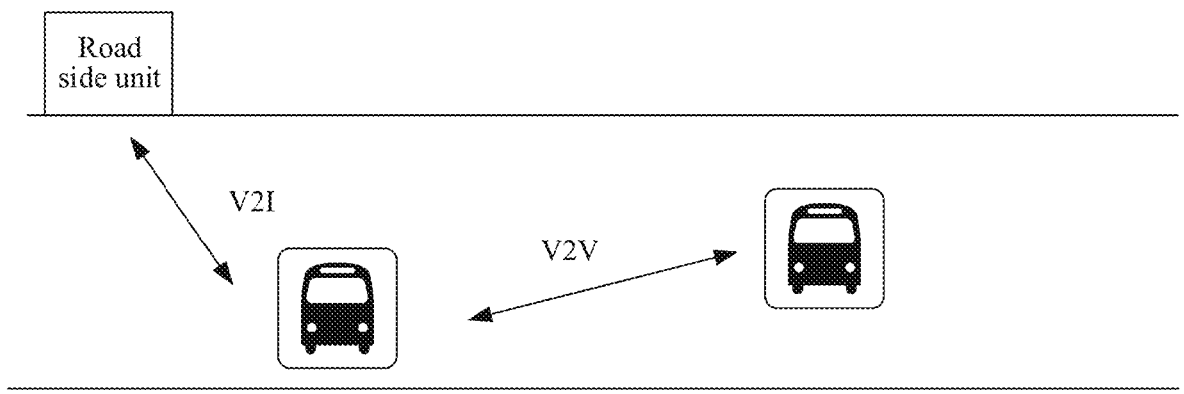
FIG. 1 is a schematic diagram of V2V communication and V2I communication.

Technical solutions of this application are described below with reference to accompanying drawings.

The technical solutions of the embodiments of this application may be applied to various communications systems, such as: a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex ( ) system, a universal mobile telecommunications system (UMTS), a worldwide interoperability for microwave access (WiMAX) communications system, a future 5th generation (5th generation, 5G) system, or a new radio (NR) system.

A terminal device in the embodiments of this application may be user equipment (UE), an access terminal, a subscriber unit, a subscriber station, a mobile station, a mobile console, a remote station, a remote terminal, a mobile device, a user terminal, a terminal, a wireless communications device, a communications apparatus, a user agent, or a user apparatus. The terminal device may also be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, an in-vehicle device, a wearable device, a terminal device in a future 5G network, or a terminal device in a future evolved public land mobile network (PLMN). This is not limited in the embodiments of this application.

A network device in the embodiments of this application may be a device configured to communicate with a terminal device. The network device may be a base transceiver station (BTS) in the global system for mobile communications (GSM) or the code division multiple access (CDMA) system, or may be a NodeB (NB) in the wideband code division multiple access (WCDMA) system, or may be an evolved NodeB (evolutional NodeB, eNB or eNodeB) in the LTE system, or may be a radio controller in a cloud radio access network (CRAN) scenario. Alternatively, the network device may be a relay station, an access point, an in-vehicle device, a wearable device, or a network device in a future 5G network, or a network device in a future evolved PLMN network. This is not limited in the embodiments of this application.

With constant development of the society, automobiles are becoming increasingly popular. Traveling by driving provides people with convenience of transportation, but also causes certain negative impacts on the human society. For example, a rapid increase in the quantity of vehicles causes a series of problems such as urban traffic congestion, frequent traffic accidents, and poor environmental quality. Based on statistics, nearly 200,000 traffic accidents occurred in China in 2013, resulting in 58,000 deaths and direct economic losses of 1.04 billion yuan. From aspects of personal safety, traffic travel efficiency, environmental protection and economic effects, a complete intelligent transportation system (ITS) is required. At present, the ITS has naturally become a focus of global attention.

Currently, vehicles can timely obtain road condition information or receive information services through V2V, V2I, V2P or V2N, and these communications modes may be collectively referred to as V2X communication. Using the most common V2V and V2I as examples, FIG. 1 is a schematic diagram of V2V communication and V2I communication. As shown in FIG. 1, through V2V communication, a vehicle may broadcast information of the vehicle, such as a speed, a driving direction, a specific location, and whether emergent braking is performed to a nearby vehicle. Therefore, a driver of the nearby vehicle may better perceive a traffic condition beyond line of sight by obtaining this type of information, to predict a dangerous situation in advance and avoid it. For the V2I communication, in addition to exchange of the foregoing security information, roadside infrastructures, such as a road side unit (RSU), may provide vehicles with access of various types of service information and data networks, and functions of charging without parking, entertainment in a vehicle and the like greatly improve traffic intelligence. A network used by the V2X communication is referred to as an Internet of Vehicles. The Internet of Vehicles is an important part of direct link communication at present.

LTE is a mainstream wireless communications technology at present, and relevant standards are formulated for V2X service characteristics and transmission requirements, so that V2X direct connection communication based on the LTE is supported. The V2X communication based on the LTE system is mainly divided into the following two transmission modes.

Centralized scheduling transmission mode (also referred to as a Mode 3): In this mode, before sending data each time, a transmit end device needs to request a transmission resource from a base station, and sends V2X service data based on the transmission resource allocated by the base station. For a centralized transmission mode, because a transmission resource of a transmit end device is dynamically and uniformly allocated by a base station, a case in which same resources are allocated to adjacent terminal devices does not occur, so that the centralized transmission mode can guarantee better transmission reliability. However, due to a need to exchange signaling between the transmit end device and the base station each time, compared with the distributed transmission mode, a transmission latency of the centralized transmission mode is relatively long. A transmit end device does not know a resource allocated by the base station to another transmit end device.

Distributed transmission mode (also referred to as a Mode 4): In this mode, a transmit end device may obtain configuration of a transmission resource pool in advance, and when the transmit device needs to send V2X data, the transmit end device can independently select a transmission resource in the pre-obtained transmission resource pool and transmit the data. Because the transmit end device independently selects a resource, different transmit end devices may select a same resource. Therefore, a transmission collision may occur. However, because in the distributed transmission mode, the transmit end device does not need to exchange signaling with the base station, a lower transmission latency is possible. The base station does not know a transmission resource selected by the transmit end device.

Figure 2:
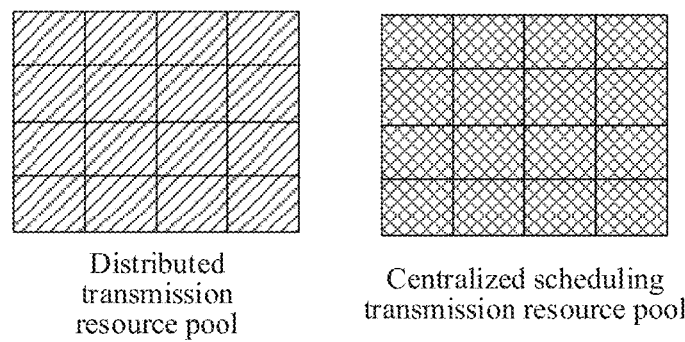
FIG. 2 is a schematic diagram of a distributed transmission resource pool and a centralized scheduling transmission resource pool that are orthogonal.

FIG. 2 is a schematic diagram of a distributed transmission resource pool and a centralized scheduling transmission resource pool that are orthogonal. The transmission resource pool of the distributed transmission mode and the transmission resource pool (also referred to as a "transmission resource set") of the centralized scheduling transmission mode are orthogonal and planned by a network. This static division results in relatively low resource utilization. For example, under coverage of a base station, an overwhelming majority of UEs are configured to send V2X service data in a distributed transmission resource pool by using a distributed transmission mode. Only a small quantity of users are configured to send V2X service data in a centralized scheduling transmission resource pool by using a centralized scheduling mode. This may cause a relatively high load of the distributed transmission resource pool. Although a load of the centralized scheduling resource pool is low, due to orthogonality of resource pool division, a terminal in the distributed transmission mode cannot use this type of resource pool. Consequently, resource utilization is relatively low, and vice versa.

Figure 3:
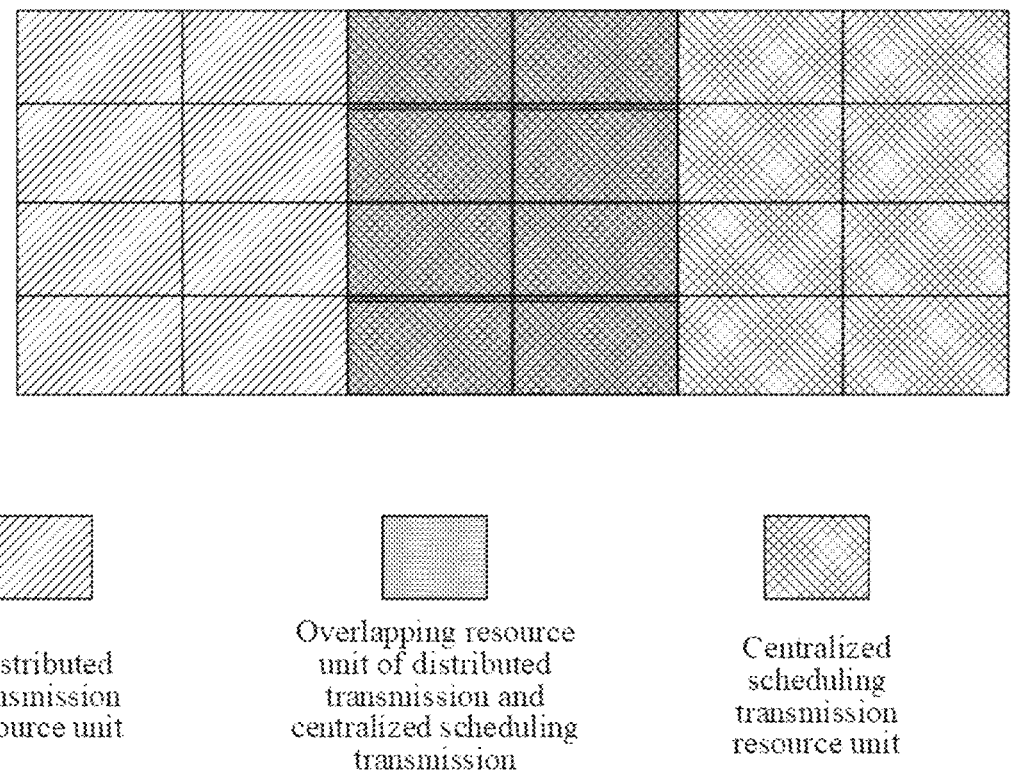
FIG. 3 is a schematic diagram showing that a distributed transmission resource pool and a centralized scheduling transmission resource pool partially overlap.

In an enhancement solution, FIG. 3 is a schematic diagram showing that a distributed transmission resource pool and a centralized scheduling transmission resource pool partially overlap. For a transmission resource pool, it may be allowed that the distributed transmission resource pool is non-orthogonal to the centralized scheduling resource. That is, transmission resources of some resource units (even all resource units) in the two types of resource pools may overlap. Such resources may be used through the distributed transmission mode, or used through the centralized scheduling transmission mode.

Figure 4:
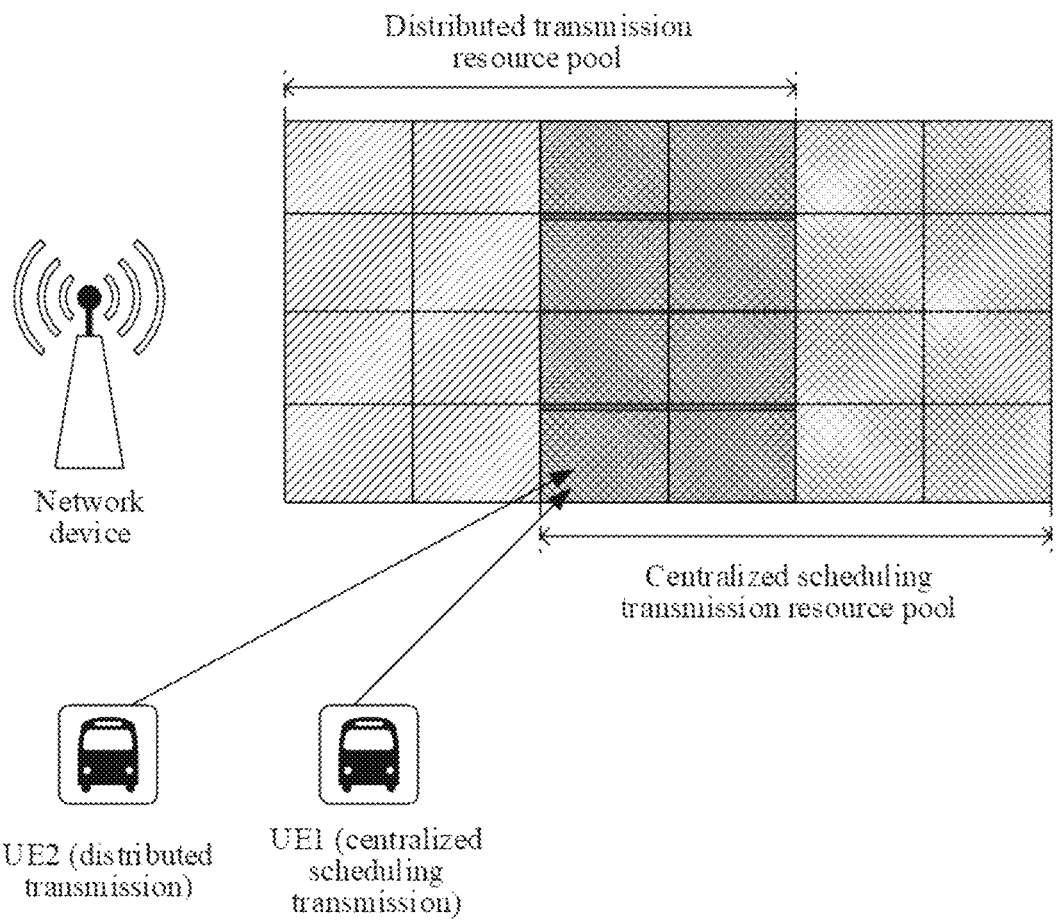
FIG. 4 is a schematic diagram showing that transmission resources in an overlapping part of a distributed transmission resource pool and a centralized scheduling resource pool collide.

When the distributed (mode 4) transmission resource pool overlaps the centralized scheduling (mode 3) resource pool, for a resource in an overlapping part, it is possible that terminal devices using different transmission modes occupy a same transmission resource. This may cause a transmission collision. FIG. 4 is a schematic diagram showing that transmission resources in an overlapping part of a distributed transmission resource pool and a centralized scheduling resource pool collide. As shown in FIG. 4, a resource unit allocated by a base station to UE1 (using the mode 3 transmission mode) and a resource unit automatically selected by UE2 (using the mode 4 transmission mode) are a same resource unit. In this case, when the UE1 and the UE2 use a same transmission resource to send a resource, mutual interference is caused. Consequently, a receive end device cannot receive data correctly. Therefore, communication quality of a user is affected, and user experience is poor. Particularly, for a transmit end device using the mode 3 transmission mode, the transmit end device needs to ensure high reliability transmission and cannot allow resources to collide with each other.

Based on the foregoing problem, an embodiment of this application provides a direct link data transmission method. When a distributed transmission resource pool overlaps a centralized scheduling resource pool, a problem of transmission resource collisions in terminal devices using different transmission modes may be avoided, thereby improving communication quality of a user, and ensuring that a terminal device using the mode 3 transmission mode can transmit data normally. Direct link data transmission is mainly a process of data transmission or information exchange between two terminal devices.

Figure 5:
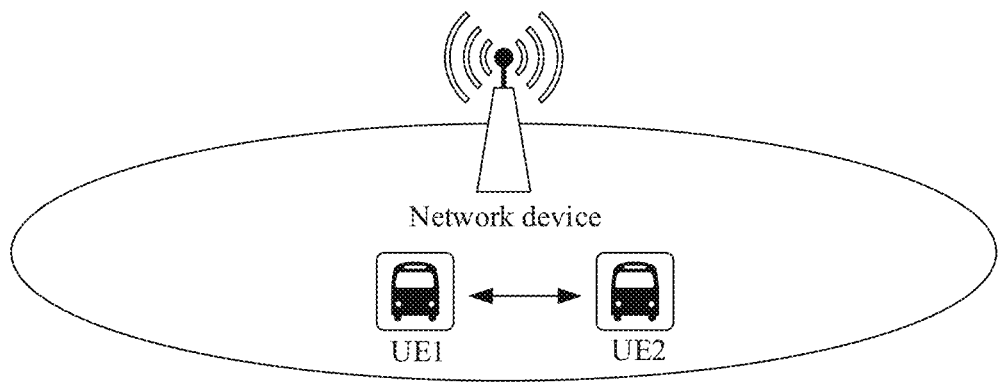
FIG. 5 is a schematic diagram of a typical application scenario according to an embodiment of this application.

FIG. 5 is a schematic diagram of a typical application scenario according to an embodiment of this application. The technical solutions of this application may be applied to a direct link communication scenario with network coverage. For example, in a V2X application scenario shown in FIG. 5, vehicles may communicate with each other through a network provided by a network device.

It should be understood that this embodiment of this application is described merely by using the application scenario shown in FIG. 5 as an example, but the embodiments of this application are not limited thereto. For example, in the system shown in FIG. 5, a vehicle may communicate with more other types of facilities. The technical solutions in the embodiments of this application may further be applied to other direct link communications technologies or a process of device-to-device (D2D) communication.

Figure 6:
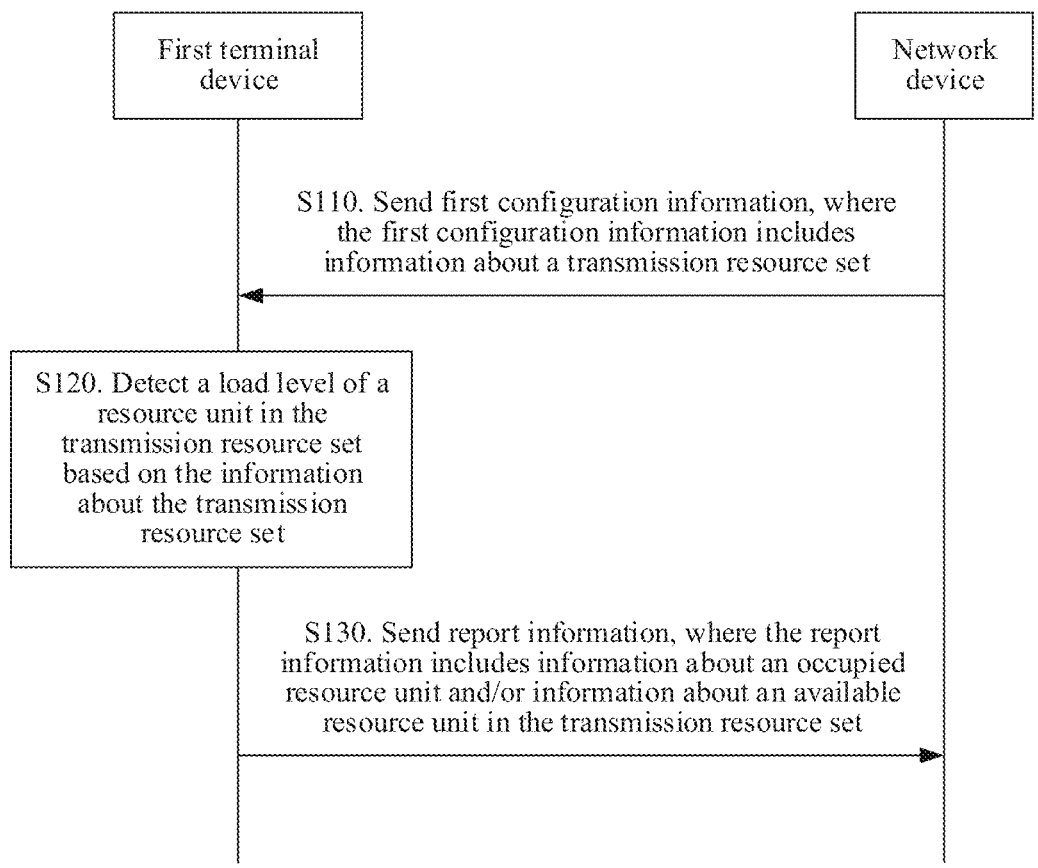
FIG. 6 is a schematic flowchart of a direct link data transmission method according to an embodiment of this application.

The direct link data transmission method provided in this application is described in detail below with reference to FIG. 6. FIG. 6 is a schematic flowchart of a direct link data transmission method 100 according to an embodiment of this application. The method 100 may be applied to the scenario shown in FIG. 5, and certainly may also be applied to another communication scenario. This is not limited in this embodiment of this application.

As shown in FIG. 6, the method 100 includes the following operations.

S110. A network device sends first configuration information to a first terminal device, where the first configuration information includes information about a transmission resource set, and the transmission resource set is a transmission resource set shared between a second terminal device that uses a centralized scheduling transmission mode and a third terminal device that uses a distributed transmission mode. Correspondingly, the first terminal device receives the first configuration information.

S120. The first terminal device detects a load level of a resource unit in the transmission resource set based on the information about the transmission resource set.

S130. The first terminal device sends report information to the network device based on the load level, where the report information includes information about an occupied resource unit and/or information about an available resource unit in the transmission resource set. Correspondingly, the network device receives the report information.

According to the direct link data transmission method provided in this embodiment of this application, when a distributed transmission resource set overlaps a centralized scheduling resource pool, the network device may send configuration information of the transmission resource set to the first terminal device that needs to request a transmission resource. The first terminal device may detect a resource unit in the transmission resource set, determine usage of the transmission resource set, and send information about an idle or available resource unit in the transmission resource set to the network device. The network device allocates a transmission resource to the first terminal device based on the information about the resource unit. In this way, the transmission resource allocated to the first terminal device can be prevented from colliding with a transmission resource independently selected by a terminal device that uses a distributed transmission mode, or a transmission resource of a terminal device that uses a centralized scheduling transmission mode. It is ensured that the first terminal device can communicate smoothly, thereby improving communication quality and user experience.

Specifically, in S110, the network device may send the first configuration information to the first terminal device, where the first configuration information includes the information about the transmission resource set. The transmission resource set is a transmission resource set shared between a second terminal device (mode 3 UE) that uses a centralized scheduling transmission mode and a third terminal device (mode 4 UE) that uses a distributed transmission mode. A resource used by the first terminal device to transmit data may be allocated by the network device. That is, when a transmission resource is allocated to the first terminal device in the transmission resource set, because a resource unit in the transmission resource set may also be used by the third terminal device that uses the distributed transmission mode, that is, the transmission resource set becomes a shared transmission resource set, a resource in the shared transmission resource set is allowed to be shared by the second terminal device that uses the centralized scheduling transmission mode and the third terminal device that uses the distributed transmission mode.

It should be understood that, in this embodiment of this application, the second terminal device and the third terminal device are merely used to distinguish between terminal devices that use different transmission modes, the second terminal device and the third terminal device represent two different types of terminal devices, and there may be one or many second terminal devices and third terminal devices. When the first terminal device needs to transmit data, the network device allocates a transmission resource in the resource pool (the transmission resource set) to the first terminal device, and this is not limited in this embodiment of this application.

It should be further understood that the first terminal device may be the second terminal or the third terminal, and this is not limited in this embodiment of this application.

It should be further understood that the second terminal device and the third terminal device may represent terminal devices with different version capabilities. For example, the second terminal device and/or the third terminal device may be a terminal supporting an LTE version 14 and/or version 15, or a terminal supporting a 5G version. This is not limited in this embodiment of this application.

It should be further understood that the first terminal device may use the centralized scheduling transmission mode or use the distributed transmission mode. In this embodiment of this application, the first terminal device may use the centralized scheduling transmission mode, that is, a required transmission resource may be configured by the network device. In this way, based on information about a resource unit in the transmission resource set, the network device allocates a transmission resource to the first terminal device. In this way, the transmission resource allocated to the first terminal device can be prevented from colliding with a transmission resource independently selected by the terminal device that uses the distributed transmission mode. It is ensured that the first terminal device can communicate smoothly, thereby improving communication quality and user experience.

The first terminal device may also use the distributed transmission mode, that is, a required transmission resource may be independently selected by the first terminal device. The first terminal device detects the load level of the transmission resource set and reports information about an occupied resource unit and/or information about an available resource unit in the transmission resource set to the network device. Therefore, when the first terminal device independently selects a resource, a problem of a collision caused by selecting a same resource unit does not occur, thereby ensuring communication quality. Moreover, the network device may send the information about the occupied resource unit and/or the information about the available resource unit in the transmission resource set to another terminal device that uses the distributed transmission mode, or allocate, based on the information about the occupied resource unit and/or the information about the available resource unit in the transmission resource set, a transmission resource to another terminal device that uses the centralized scheduling transmission mode. In this way, the transmission resource allocated by the network device to the terminal device that uses the centralized scheduling transmission mode can also be prevented from colliding with a transmission resource independently selected by the terminal device that uses the distributed transmission mode. It is ensured that these terminal devices can communicate smoothly.

It should be understood that the transmission resource set may be a centralized scheduling transmission resource set currently used by the first terminal device, or a subset of the centralized scheduling transmission resource set currently used, or another independent resource pool or resource set completely or partially overlapping the centralized scheduling transmission resource set currently used, or a subset of another distributed transmission resource pool, or may be another independent resource pool or resource set completely orthogonal to the centralized scheduling transmission resource set currently used. This is not limited in this embodiment of this application.

In one embodiment, the network device may send the configuration information through radio resource control (RRC) dedicated signaling or system information. The configuration information may also be sent in another manner, and this is not limited in this embodiment of this application.

In one embodiment, in an embodiment, before S110, the method 100 may further include: S109. When the first terminal device needs to transmit data, the first terminal device sends request information to the network device, where the request information is used to request the network device for a time-frequency resource for data transmission. For example, the request information may include information such as a quantity of required resource units. This is not limited in this embodiment of this application.

In S120, the first terminal device detects the load level of the resource unit in the transmission resource set based on the information about the transmission resource set. The load level may include a ratio of occupied resources to all resources, or a total quantity of the occupied resources, or a total quantity of available resources, or the like. This is not limited in this embodiment of this application.

For example, the first terminal device detects occupancy of a resource unit in the transmission resource set. The first terminal device may detect, in the transmission resource set, a ratio/quantity of occupied transmission resources, which may be a ratio/quantity of transmission resource units occupied by the second terminal device in the transmission resource set, or a ratio/quantity of transmission resource units occupied by the third terminal device in the transmission resource set. Further, when the first terminal device detects the ratio/quantity of the transmission resource units occupied by the second terminal device and the third terminal device in the transmission resource set, the first terminal device may determine whether a corresponding resource unit is occupied by the second terminal device or the third terminal device by reading mode indication information in direct link data sent on the resource unit. The mode indication information may be located in a media access control protocol data unit (MAC PDU) corresponding to the received direct link data, or in scheduling assignment (SA) information corresponding to the direct link data, or the like. This is not limited in this embodiment of this application.

In one embodiment, the first terminal device may further determine whether the resource unit is available by detecting energy of a resource unit in the transmission resource set. For example, when the first terminal device fails to detect energy or detects that an energy threshold is less than or equal to a preset threshold on one transmission resource unit, the first terminal device determines that the transmission resource unit is available, that is, not occupied. Alternatively, when it is detected that energy on a resource is greater than or equal to a preset threshold, and a data priority is higher than another threshold, it is considered that one resource is occupied; or when data on one resource can be decoded successfully, it is considered that the resource is occupied. This is not limited in this embodiment of this application.

In one embodiment, when the first terminal device determines, on one transmission resource unit based on reservation information in decoded data, that the resource unit is not reserved in a subsequent period of time, the first terminal device determines that the transmission resource unit is idle. The transmission resource unit may be a transmission sub-channel, and information about the transmission resource unit may be a time-frequency resource location of the resource unit or a transmission resource identifier of the resource unit, or the like. This is not limited in this embodiment of this application.

It should be understood that, in this embodiment of this application, the first terminal device may detect, by using a plurality of detection methods, whether a resource unit in the transmission resource set is occupied, and may detect another indicator that may reflect the load level. This is not limited in this embodiment of this application.

It should be further understood that, in this embodiment of this application, when the third terminal device that uses the distributed transmission mode transmits data by using a resource unit in the transmission resource set, a transmission resource may be selected in a manner of listening first and reserving later. To be specific, when a resource unit is detected to be idle, the resource unit may be reserved by the third terminal device for use by the third terminal device within subsequent fixed duration, that is, the resource unit is in an occupied state within the fixed duration.

In S130, the first terminal device sends the report information to the network device based on the load level, where the report information includes the information about the occupied resource unit and/or the information about the available resource unit in the transmission resource set. In one embodiment, the report information may further include load levels of all or some of resource units in the transmission resource set, or include other load information in the transmission resource set. Correspondingly, the network device receives the report information.

It should be understood that the information about the resource unit may be time-frequency resource information, or bitmap information (each bit represents one time-frequency resource or channel), or index identification information of a resource location or channel, or the like, and this is not limited in this embodiment of this application.

Figure 7:
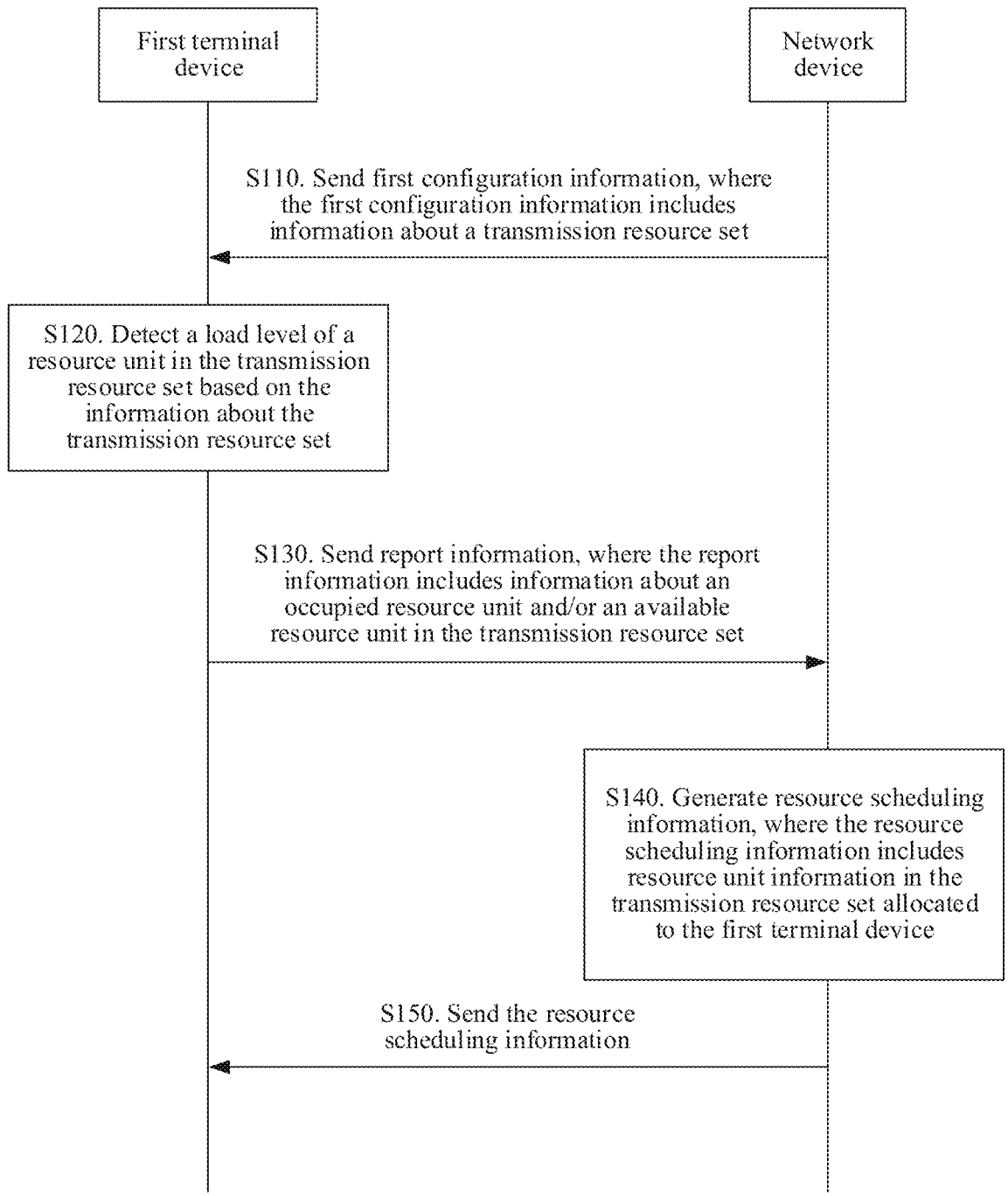
FIG. 7 is a schematic flowchart of a direct link data transmission method according to another embodiment of this application.

In one embodiment, in an embodiment, as shown in FIG. 7, the method 100 may further include:

S140. The network device generates resource scheduling information based on the report information, where the resource scheduling information includes resource unit information in the transmission resource set allocated to the first terminal device.

S150. The network device sends the resource scheduling information to the first terminal device. Correspondingly, the first terminal device receives the resource scheduling information.

In S140, based on the report information, that is, based on the information about the occupied resource unit or the information about available resource unit in the transmission resource set, the network device generates the resource scheduling information. The resource scheduling information includes resource unit information in the transmission resource set allocated to the first terminal device. That is, the network device determines, from the available resource unit, a resource unit allocated to the first terminal device. For example, the resource scheduling information may be numbers, time-frequency resource locations, transmission resource identifiers, or the like that are of one or some idle resource units. This is not limited in this embodiment of this application.

In S150, the network device sends the resource scheduling information to the first terminal device. Correspondingly, the first terminal device receives the resource scheduling information. In one embodiment, after receiving the resource scheduling information, the first terminal device may perform, based on the information that is about a resource unit allocated to the first terminal device and that is in the resource scheduling information, data transmission on the resource unit. Therefore, it is ensured that the transmission resource allocated to the first terminal device and a transmission resource independently selected by the terminal device that uses the distributed transmission mode do not collide. Further, it is ensured that the terminal device that uses the centralized scheduling transmission mode can communicate smoothly, thereby improving communication quality and user experience.

It should be understood that, in this embodiment of this application, a granularity of a resource unit included in the transmission resource set may be a physical resource block (PRB), a resource element group (REG), a control channel element (CCE), or the like, and this is not limited in this embodiment of this application.

In one embodiment, in an embodiment, the first configuration information further includes a first threshold and/or a second threshold, where the first threshold is less than or equal to the second threshold, and before S130, the method 100 further includes:

S121. When the load level is greater than or equal to the first threshold, the first terminal device determines to send the report information to the network device, or when the load level is greater than or equal to the first threshold and is less than or equal to the second threshold, the first terminal device determines to send the report information to the network device, or when the load level is less than or equal to the second threshold, the first terminal device determines to send the report information to the network device.

Specifically, the first terminal device may detect a load level of the shared transmission resource set, for example, the load level may be a ratio/quantity of transmission resource units occupied by the second terminal device in the transmission resource set. By detecting a load level of a resource unit in the transmission resource set, when the load level is greater than or equal to the first threshold, the report information is sent to the first terminal device. In this way, when the load level is relatively low, because a relatively large quantity of resource units in the transmission resource set are in an available state, the network device may allocate a resource in the transmission resource set to the first terminal device based on a requirement of an existing centralized transmission mode, and a probability that the transmission resource allocated to the first terminal device collides with a transmission resource independently selected by the terminal device that uses the distributed transmission mode can be greatly reduced. Moreover, the first terminal device does not need to report the report information, so that signaling and a resource are saved while a probability of a resource collision is reduced. Therefore, communication efficiency is further improved.

In one embodiment, when the load level is greater than or equal to the first threshold and is less than or equal to the second threshold, the first terminal device determines to send the report information to the network device, thereby further determining a condition to satisfy reporting. For example, it may be specified that different quantities of resource units are reported for different load levels. For example, the first threshold is 0.5, the second threshold is 0.6, and 10 available resource units are reported when $0.5 \le a$ load level value $\le 0.6$. Alternatively, when $0.6 \le a$ load level value $\le 0.7$, it is specified to report five available resource units. In this way, resources consumed for reporting may be further reduced, and a utilization rate of a resource and a reporting certainty are improved. Therefore, communication efficiency is further improved.

In one embodiment, when the load level is less than or equal to the second threshold, the first terminal device determines to send the report information to the network device. That is, it may be specified that the load level is reported when the load level is less than the second threshold. In this way, the network device can be more accurately notified of usage of all resource units of the transmission resource pool, so that resources allocated to the first terminal device by the network device cannot have a problem of collision. Therefore, communication quality is ensured.

In one embodiment, in an embodiment, the load level include:

a load level of a resource unit used by the third terminal device in the transmission resource set; or a load level of a resource unit used by the second terminal device and the third terminal device in the transmission resource set.

To be specific, the transmission resource set is a transmission resource set shared between a second terminal device (mode 3 UE) that uses a centralized scheduling transmission mode and a third terminal device (mode 4 UE) that uses a distributed transmission mode. For the centralized scheduling transmission mode, because it is a mode in which the network device allocates a resource, the network device knows resource units in the transmission resource set that are occupied by the second terminal device, and does not know resource units occupied by the third terminal device. Therefore, the first terminal device only needs to detect a load level of a resource unit that is in the transmission resource set and used by the third terminal device, thereby reducing resources used for detection and reporting, and reducing energy consumption. After knowing the resource units in the resource pool that are used by the third terminal device, by taking into account the resource units used by the second terminal device that uses the centralized scheduling transmission mode that are already known by the network device, the network device may determine which resources are available.

In one embodiment, in an embodiment, the load level detected by the first terminal device may further be the load level of the resource unit that is in the transmission resource set and used by the third terminal device and second terminal device. This is not limited in this embodiment of this application.

It should be understood that the foregoing load levels are all resource units used by the third terminal device, or all resource units used by the third terminal device and the second terminal device. This is not limited in this embodiment of this application.

In one embodiment, in an embodiment, the first configuration information further includes a third threshold M and/or a fourth threshold T, where M is less than or equal to T, and the method 100 further includes:

determining, by the first terminal device, K available resource units in the transmission resource set, where K is less than or equal to M; or determining, by the first terminal device, K available resource units in the transmission resource set, where K is greater than or equal to T; or determining, by the first terminal device, K available resource units in the transmission resource set, where K is greater than or equal to M and is less than or equal to T.

The information about the idle resource unit in the report information is the information about the K idle resource units.

In one embodiment, when the first terminal device detects that there are a plurality of available resource units in the transmission resource set, if information about all available resource units is reported, signaling overheads and resource consumption are increased. Therefore, the network device may determine a condition of a required resource, for example, a quantity of required resource units, based on a condition of data transmission by the first terminal device. The third threshold M and/or the fourth threshold T are/is determined, where M is less than or equal to T, and the configuration information further includes the third threshold M and/or the fourth threshold T.

In one embodiment, the first terminal device determines K available resource units in the plurality of idle resource units, where K is less than or equal to M, and then reports information about the K available resource units to the network device. In this way, on the premise that a transmission resource required by the first terminal device is satisfied, signaling overheads and resource consumption can be further reduced.

In one embodiment, the first terminal device may further determine K available resource units in the transmission resource set, where K is greater than or equal to T. That is, the quantity of reported resource units has a lower limit value, so that it can be ensured that resources allocated to the first terminal device are sufficient, thereby ensuring that the first terminal device can normally transmit data.

In one embodiment, the first terminal device may further determine K available resource units in the transmission resource set, where K is greater than or equal to M and is less than or equal to T. The network device may further determine a reported lower limit value M and a reported upper limit value T based on a condition of a resource required by the first terminal device, for example, the quantity of required resource units. The first terminal device determines K idle resource units in the plurality of idle resource units, where K is less than or equal to M and is greater than or equal to T. In this way, while signaling overheads and resource consumption are reduced, it can also be ensured that the transmission resource required by the first terminal device is satisfied. Therefore, it is ensured that the first terminal device sends data normally, thereby improving communication quality.

It should be understood that the first terminal device may determine K available resource units by using a plurality of methods. For example, the first terminal device may randomly select K available resource units in all available resource units, or sort available resources based on a rule, for example, sort the available resource units in ascending order of energy values of the resource units, and select first K available resources. Another rule or method may also be used, and this is not limited in this embodiment of this application.

In one embodiment, in an embodiment, the first terminal device and the second terminal device are located in a first cell, and the third terminal device is located in a second cell.

Specifically, the second terminal device and the third terminal device that use the transmission resource set may be located in different cells. That is, the second terminal device that uses the centralized scheduling transmission mode and the third terminal device that uses the distributed transmission mode are located in different cells. A centralized scheduling transmission resource set allocated by the network device to the second terminal device in the first cell and a distributed transmission pool allocated to third terminal device in the second cell may overlap on an edge of the two cells. In this case, collisions of transmission resources may exist. Therefore, the technical solution in this embodiment of this application may also be used, to ensure the first terminal device that uses the centralized scheduling transmission mode may communicate normally, thereby improving communication efficiency.

According to the direct link data transmission method provided in this embodiment of this application, when a distributed transmission resource set overlaps a centralized scheduling resource pool, the network device may send configuration information of a shared transmission resource set to the first terminal device that needs to request a transmission resource. The first terminal device may detect a resource unit in the transmission resource set, and determine usage of the transmission resource set. Based on the usage of the transmission resource set, the network device allocates a transmission resource to the first terminal device. In this way, a probability that the transmission resource allocated to the first terminal device and a transmission resource independently selected by the terminal device that uses the distributed transmission mode collide may be avoided or reduced. A guarantee rate of smooth communication of the terminal device that uses the centralized scheduling transmission mode is improved, thereby improving communication quality and user experience.

In one embodiment, in an embodiment, the first terminal device and the second terminal device are located in the first cell, and the third terminal device may also be located in the same cell. This is not limited in this embodiment of this application.

In one embodiment, in an embodiment, before S120, the method 100 further includes:

receiving, by the first terminal device, second configuration information sent by the network device, where the second configuration information includes a fifth threshold and/or a sixth threshold, and the fifth threshold is less than or equal to the sixth threshold; and the detecting, by the first terminal device, a load level of a resource unit in the transmission resource set based on the information about the transmission resource set includes:

detecting, by the first terminal device, the load level when signal quality of the network device detected by the first terminal device is less than or equal to the fifth threshold, or detecting, by the first terminal device, the load level when signal quality of the network device detected by the first terminal device is greater than or equal to the sixth threshold, or detecting, by the first terminal device, the load level when signal quality of the network device detected by the first terminal device is greater than or equal to the fifth threshold and is less than or equal to the sixth threshold.

In one embodiment, when moving in the first cell, the first terminal device may continuously receive signals sent by the network device. When the first terminal device detects that received signal quality is less than or equal to the fifth threshold, it is proved that the network device is located on an edge of the first cell. On an edge of a cell, a case in which a resource unit in a transmission resource pool used by the first terminal device is occupied by a terminal device in another cell may occur. Therefore, the first terminal device may start to detect a load level of the resource unit in the transmission resource pool. In this way, detection of a load level of a transmission resource set can be performed more accurately, and resources used during load detection are reduced, thereby improving a resource utilization rate.

In one embodiment, higher signal quality that is of the network device and received by the first terminal device proves a shorter distance between the first terminal device and the network device. Lower signal quality proves a longer distance between the first terminal device and the network device, that is, closer to a cell edge. Therefore, to determine a location of the first terminal device more accurately, the configuration information may further include a sixth threshold, where the fifth threshold is less than or equal to the sixth threshold. The fifth threshold and the sixth threshold are used to determine whether the first terminal device is located on a cell edge. When received signal quality of the network device is greater than or equal to the fifth threshold and is less than or equal to the sixth threshold, the first terminal device is determined to be located on the cell edge. Based on the configuration information, the first terminal device starts to detect a load level of a resource unit in the transmission resource pool. A condition under which the first terminal device starts to detect a transmission resource pool may be defined more accurately, thereby improving detection accuracy and efficiency, avoiding unnecessary detection, and reducing resource consumption.

In one embodiment, when signal quality of the network device detected by the first terminal device is greater than or equal to the sixth threshold, the first terminal device determines to start to detect the load level. In this way, it can be ensured to detect a load level of the transmission resource set in time. A case in which a resource unit that has been transmitted in the transmission resource set is used by another terminal device without detection is avoided, thereby ensuring accuracy of a load level of the transmission resource set.

According to the direct link data transmission method provided in this embodiment of this application, when the first terminal device that uses a centralized scheduling transmission mode moves to an edge of a cell, if it is detected that a resource unit in a transmission resource pool allocated to the first terminal device in the cell (a first cell) overlaps a transmission resource of a terminal device that uses a distributed transmission mode and/or a centralized scheduling transmission mode in another cell (a second cell), the first terminal device may detect the resource unit in the resource pool to determine usage of the resource pool, and send information about an idle or available resource unit in the resource pool to the network device, which allocates a transmission resource to the first terminal device based on load information of the resource unit, so that the transmission resource allocated to the first terminal device can be prevented from colliding with a transmission resource of a terminal device in another cell. It is ensured that that terminal device that uses the centralized scheduling transmission mode in the cell can communicate smoothly, thereby improving communication quality and user experience.

It should be understood that the second configuration may be the first configuration information, or may be other information different from the first configuration information. This is not limited in this embodiment of this application.

It should be understood that, in the embodiments of this application, sequence numbers of the foregoing processes and operations do not mean execution orders. The execution orders of the processes should be determined based on functions and internal logic of the processes, and should not cause any limitation on the implementation processes of the embodiments of this application.

The direct link data transmission method of the embodiments of this application is described in detail above with reference to FIG. 1 to FIG. 7, and a terminal device and a network device of the embodiments of this application are described in detail below with reference to FIG. 8 to FIG. 11.

Figure 8:
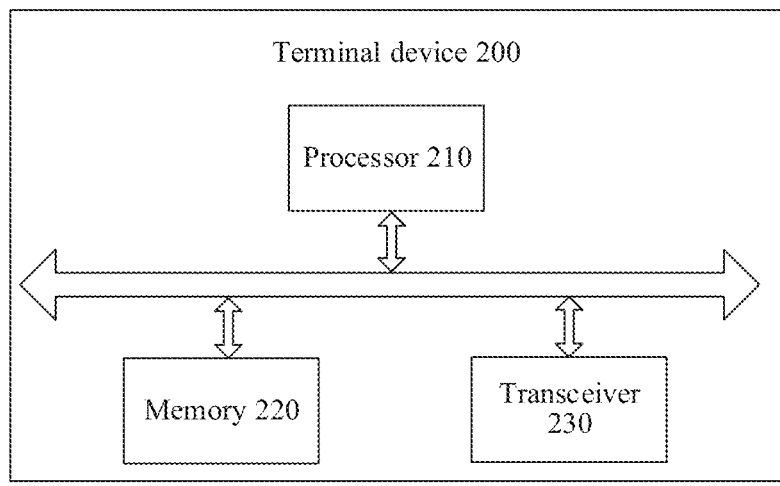
FIG. 8 is a schematic block diagram of a terminal device according to an embodiment of this application.

FIG. 8 is a schematic block diagram of a terminal device according to an embodiment of this application. It should be understood that the terminal device may refer to the foregoing first terminal device, and terminal device embodiments and the method embodiments correspond to each other. For a similar description, refer to the method embodiments. A terminal device 200 shown in FIG. 8 may be configured to perform operations corresponding to the operations performed by the first terminal device in FIG. 6 and FIG. 7. The terminal device 200 includes: a processor 210, a memory 220, and a transceiver 230, where the processor 210, the memory 220, and the transceiver 230 are connected through communication, the memory 220 stores an instruction, the processor 210 is configured to execute the instruction stored in the memory 220, and the transceiver 230 is configured to perform specific signal receiving/transmission under driving of the processor 210.

The transceiver 230 is configured to receive first configuration information sent by a network device, where the first configuration information includes information about a transmission resource set, and the transmission resource set is a transmission resource set shared between a second terminal device that uses a centralized scheduling transmission mode and a third terminal device that uses a distributed transmission mode;

the processor 210 is configured to detect a load level of a resource unit in the transmission resource set based on the information about the transmission resource set; and the transceiver 230 is further configured to: send report information to the network device, where the report information includes information about an occupied resource unit and/or information about an available resource unit in the transmission resource set.

According to the terminal device provided in this embodiment of this application, when a distributed transmission resource set overlaps a centralized scheduling resource pool, the network device may send configuration information of the transmission resource set (an overlapping resource pool) to a terminal device that needs to request a transmission resource. The terminal device may detect a resource unit in the transmission resource set, determine usage of the transmission resource set, and send information about an idle or available resource unit in the transmission resource set to the network device. The network device allocates a transmission resource to the terminal device based on the information about the resource unit. In this way, the transmission resource allocated to the terminal device can be prevented from colliding with a transmission resource independently selected by a terminal device that uses a distributed transmission mode. It is ensured that the terminal device can communicate smoothly, thereby improving communication quality and user experience.

Components in the terminal device 200 are connected through communication, that is, the processor 210, the memory 220, and the transceiver 230 communicate with each other and transfer control and/or data signals through an internal connection path. The foregoing method embodiments of this application may be applied to a processor, or the operations of the foregoing method embodiments are implemented by a processor. The processor may be an integrated circuit chip and has a signal processing capability. In an implementation process, the operations in the foregoing method embodiments may be completed by using a hardware integrated logic circuit in a processor, or by using an instruction in a form of software. The processor may be a central processing unit (CPU), a network processor (NP), a combination of a CPU and an NP, a digital signal processor (DSP), an application-specific integrated circuit (ASIC), a field programmable gate array (FPGA), another programmable logic device, a discrete gate, a transistor logic device, or a discrete hardware component. It may implement or perform the methods, the operations, and logical block diagrams that are disclosed in this application. A general purpose processor may be a microprocessor, or the processor may be any conventional processor, or the like. The operations of the methods disclosed in this application may be directly executed and completed by using a hardware decoding processor, or may be executed and completed by using a combination of hardware and software modules in the decoding processor. A software module may be located in a mature storage medium in the field, such as a random access memory, a flash memory, a read-only memory, a programmable read-only memory, an electrically erasable programmable memory, a register, or the like. The storage medium is located in a memory, and a processor reads information in the memory and completes the operations in the foregoing methods in combination with hardware of the processor.

In one embodiment, in another embodiment of this application, the first configuration information further includes a first threshold and/or a second threshold, where the first threshold is less than or equal to the second threshold.

The processor 230 is further configured to: determine to send the report information to the network device when the load level is greater than or equal to the first threshold; or determine to send the report information to the network device when the load level is greater than or equal to the first threshold and is less than or equal to the second threshold; or determine to send the report information to the network device when the load level is less than or equal to the second threshold.

Optionally, in another embodiment of this application, the load level includes:
a load level of a resource unit used by the third terminal device in the transmission resource set; or
a load level of a resource unit used by the second terminal device and the third terminal device in the transmission resource set.

Optionally, in another embodiment of this application, the first configuration information further includes a third threshold M and/or a fourth threshold T, where M is less than or equal to T.

The processor 210 is further configured to: determine K available resource units in the transmission resource set, where K is less than or equal to M; or determine K available resource units in the transmission resource set, where K is greater than or equal to T; or
determine K available resource units in the transmission resource set, where K is greater than or equal to M and is less than or equal to T; and
the information about the idle resource unit in the report information is the information about the K idle resource units.

In one embodiment, in another embodiment of this application, before the processor 210 detects the load level of the resource unit in the transmission resource set,
the transceiver 230 is further configured to: receive second configuration information sent by the network device, where the second configuration information includes a fifth threshold and/or a sixth threshold, and the fifth threshold is less than or equal to the sixth threshold; and
the processor 210 is specifically configured to: detect the load level of the transmission resource set when detected signal quality of the network device is less than or equal to the fifth threshold, or
detect the load level when detected signal quality of the network device is greater than or equal to the sixth threshold, or
detect the load level when detected signal quality of the network device is greater than or equal to the fifth threshold and is less than or equal to the sixth threshold.

In one embodiment, in another embodiment of this application, the terminal device uses a centralized scheduling transmission mode or uses a distributed transmission mode.

In one embodiment, in another embodiment of this application, after sending the report information to the network device, the transceiver 230 is further configured to:
receive resource scheduling information sent by the network device, where the resource scheduling information is generated based on the report information, and the resource scheduling information includes resource unit information in the transmission resource set allocated to the terminal device.

Figure 9:
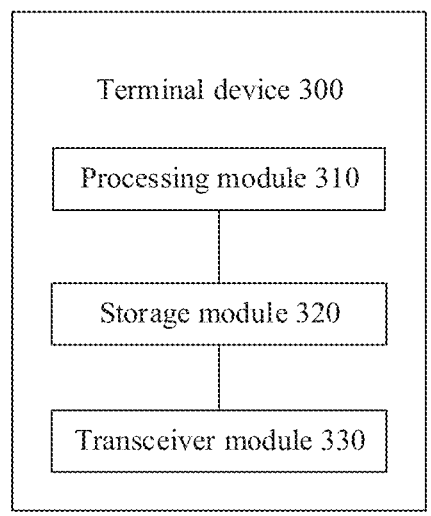
FIG. 9 is a schematic block diagram of a terminal device according to another embodiment of this application.

It should be noted that, in this embodiment of this application, the processor 210 may be implemented by a processing module, the memory 220 may be implemented by a storage module, and the transceiver 230 may be implemented by a transceiver module. As shown in FIG. 9, a terminal device 300 may include a processing module 310, a storage module 320, and a transceiver module 330.

The terminal device 200 shown in FIG. 8 or the terminal device 300 shown in FIG. 9 can implement the operations performed by the first terminal device in foregoing FIG. 6 and FIG. 7. To avoid repetition, details are not described herein again.

Figure 10:
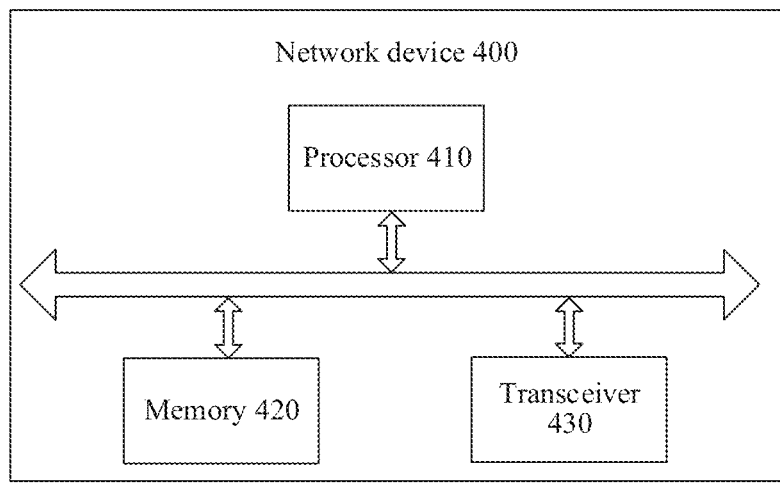
FIG. 10 is a schematic block diagram of a network device according to an embodiment of this application.

FIG. 10 is a schematic block diagram of a network device 400 according to an embodiment of this application. It should be understood that network device embodiments and the method embodiments correspond to each other, and for a similar description, refer to the method embodiments. As shown in FIG. 10, the network device 400 includes: a processor 410, a memory 420, and a transceiver 430, where the processor 410, the memory 420, and the transceiver 430 are connected through communication, the memory 420 stores an instruction, the processor 410 is configured to execute the instruction stored in the memory 420, and the transceiver 430 is configured to perform specific signal receiving/transmission under driving of the processor 410.

The transceiver 430 is configured to send first configuration information to a first terminal device, where the first configuration information includes information about a transmission resource set, and the transmission resource set is a transmission resource set shared between a second terminal device that uses a centralized scheduling transmission mode and a third terminal device that uses a distributed transmission mode; and the transceiver 430 is further configured to receive report information sent by the first terminal device, where the report information includes information about an occupied resource unit and/or information about an available resource unit in the transmission resource set.

According to the network device provided in this embodiment of this application, when a distributed transmission resource set overlaps a centralized scheduling resource pool, the network device may send configuration information of the transmission resource set (an overlapping resource pool) to a terminal device that needs to request a transmission resource. The terminal device may detect a resource unit in the transmission resource set, determine usage of the transmission resource set, and send information about an idle or available resource unit in the transmission resource set to the network device. The network device allocates a transmission resource to the terminal device based on the information about the resource unit. In this way, the transmission resource allocated to the terminal device can be prevented from colliding with a transmission resource independently selected by a terminal device that uses a distributed transmission mode. It is ensured that the terminal device can communicate smoothly, thereby improving communication quality and user experience.

Components in the network device 400 are connected through communication, that is, the processor 410, the memory 420, and the transceiver 430 communicate with each other and transfer control and/or data signals through an internal connection path. The foregoing method embodiments of this application may be applied to a processor, or the operations of the foregoing method embodiments are implemented by a processor. The processor may be an integrated circuit chip and has a signal processing capability. In an implementation process, the operations in the foregoing method embodiments may be completed by using a hardware integrated logic circuit in a processor, or by using an instruction in a form of software. The foregoing processor may be a CPU, a network processor NP, a combination of a CPU and an NP, a DSP, an ASIC, an FPGA, another programmable logic device, a discrete gate, a transistor logic device, or a discrete hardware component. It may implement or perform the methods, the operations, and logical block diagrams that are disclosed in this application. A general purpose processor may be a microprocessor, or the processor may be any conventional processor, or the like. The operations of the methods disclosed in this application may be directly executed and completed by using a hardware decoding processor, or may be executed and completed by using a combination of hardware and software modules in the decoding processor. A software module may be located in a mature storage medium in the field, such as a random access memory, a flash memory, a read-only memory, a programmable read-only memory, an electrically erasable programmable memory, a register, or the like. The storage medium is located in a memory, and a processor reads information in the memory and completes the operations in the foregoing methods in combination with hardware of the processor.

In one embodiment, in another embodiment of this application, the first configuration information further includes a first threshold and/or a second threshold, where the first threshold is less than or equal to the second threshold, and the first threshold and/or the second threshold are/is used for the first terminal device to determine to send report information to the network device based on a load level of the transmission resource set.

In one embodiment, in another embodiment of this application, the first configuration information further includes a third threshold M and/or a fourth threshold T, M is less than or equal to T, and the information about the available resource unit in the report information is the information about the K available resource units, where K is less than or equal to M, or K is greater than or equal to T, or K is greater than or equal to M and is less than or equal to T.

In one embodiment, in another embodiment of this application, the transceiver 430 is further configured to: send second configuration information to the first terminal device, where the second configuration information includes a fifth threshold and/or a sixth threshold, the fifth threshold is less than or equal to the sixth threshold, and the fifth threshold and/or the sixth threshold are/is used for the first terminal device to determine to start to detect the load level of the transmission resource set.

In one embodiment, in another embodiment of this application, the load level includes:

a load level of a resource unit used by the third terminal device in the transmission resource set; or a load level of a resource unit used by the second terminal device and the third terminal device in the transmission resource set.

In one embodiment, in another embodiment of this application, the first terminal device uses a centralized scheduling transmission mode or uses a distributed transmission mode.

In one embodiment, in another embodiment of this application, the transceiver 430 is further configured to: send resource scheduling information to the first terminal device, where the resource scheduling information is generated based on the report information, and the resource scheduling information includes resource unit information in the transmission resource set allocated to the first terminal device.

Figure 11:
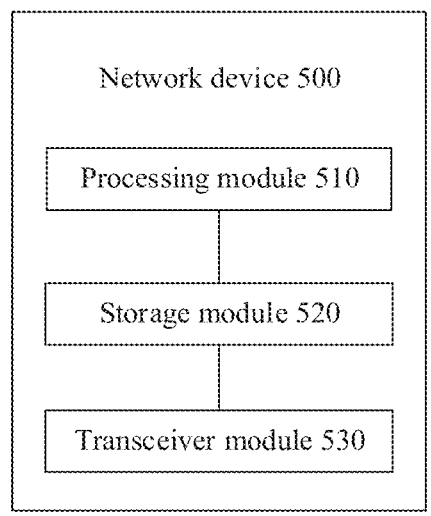
FIG. 11 is a schematic block diagram of a network device according to another embodiment of this application.

It should be noted that, in this embodiment of the present invention, the processor 410 may be implemented by a processing module, the memory 420 may be implemented by a storage module, and the transceiver 430 may be implemented by a transceiver module. As shown in FIG. 11, a network device 500 may include a processing module 510, a storage module 520, and a transceiver module 530.

The network device 400 shown in FIG. 10 or the network device 500 shown in FIG. 11 can implement the operations performed by the network device in foregoing FIG. 6 and FIG. 7. To avoid repetition, details are not described herein again.

An embodiment of this application further provides a computer readable medium. The computer readable medium is configured to store computer program code, and the computer program includes an instruction used to perform the direct link data transmission method of the embodiments of this application in FIG. 6 and FIG. 7. The readable medium may be a read-only memory (ROM) or a random access memory (RAM). This is not limited in the embodiments of this application.

An embodiment of this application further provides a communications system. The communications system includes the terminal device provided in the foregoing embodiments of this application and the network device provided in the foregoing embodiments of this application, and the communications system may complete any direct link data transmission method provided in the embodiments of this application.

An embodiment of this application further provides a system on chip. The system on chip includes: a processing unit and a communications unit, where the processing unit may be, for example, a processor, and the communications unit may be, for example, an input/output interface, a pin, a circuit, or the like. The processing unit may execute a computer instruction, so that a chip in the terminal performs the direct link data transmission method according to any implementation of the foregoing first aspect.

In one embodiment, the computer instruction is stored in a storage unit.

In one embodiment, the storage unit is a storage unit in the chip, for example, a register or a cache, or the storage unit may be a storage unit that is in the terminal and that is located outside the chip, for example, a ROM, another type of static storage device that can store static information and an instruction, or a RAM. Any processor mentioned above may be a CPU, a microprocessor, an ASIC, or one or more integrated circuits that are configured to control execution of a program of the foregoing first direct link data transmission method.

It should be understood that, the term "and/or" and "at least one of A or B" in this specification describe only an association relationship between associated objects, and represent that three relationships may exist. For example, A and/or B may represent the following three cases: Only A exists, both A and B exist, and only B exists. In addition, the character "/" in this specification generally indicates an "or" relationship between adjacent associated objects.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the operations of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A direct link data transmission method, comprising:
receiving, by a first terminal device, first configuration information sent by a network device, wherein the first configuration information comprises information about a transmission resource set shared between a second terminal device that uses a centralized scheduling transmission mode and a third terminal device that uses a distributed transmission mode, wherein the first configuration information further comprises a first threshold and a second threshold;
detecting, by the first terminal device, a load level of the transmission resource set based on the information about the transmission resource set, wherein the load level comprises a ratio of occupied resource units in the transmission resource set to all resource units in the transmission resource set; and
sending, by the first terminal device, report information to the network device based on the load level when the load level is greater than or equal to the first threshold and less than or equal to the second threshold, wherein the report information comprises information about one or more occupied resource units and/or information about one or more available resource units in the transmission resource set.

2. The method according to claim 1, wherein the load level comprises:
   a load level of a resource unit used by the third terminal device in the transmission resource set; or
   a load level of a resource unit used by the second terminal device and the third terminal device in the transmission resource set.

3. The method according to claim 1,
   wherein the first configuration information further comprises one of a third threshold M or a fourth threshold T, M being less than or equal to T;
   wherein the method further comprises:
   determining, by the first terminal device, K available resource units in the transmission resource set, wherein K is less than or equal to M; or
   determining, by the first terminal device, K available resource units in the transmission resource set, wherein K is greater than or equal to T; or
   determining, by the first terminal device, K available resource units in the transmission resource set, wherein K is greater than or equal to M and is less than or equal to T; and
   wherein the information about the one or more available resource units in the report information is information about the K available resource units.

4. The method according to claim 1, wherein before the detecting, by the first terminal device, the load level of the transmission resource set, the method further comprises:
   receiving, by the first terminal device, second configuration information sent by the network device, wherein the second configuration information comprises a fifth threshold and/or a sixth threshold, and the fifth threshold is less than or equal to the sixth threshold;
   detecting, by the first terminal device, the load level when signal quality of the network device detected by the first terminal device is less than or equal to the fifth threshold, or
   detecting, by the first terminal device, the load level when the signal quality of the network device detected by the first terminal device is greater than or equal to the sixth threshold, or
   detecting, by the first terminal device, the load level when the signal quality of the network device detected by the first terminal device is greater than or equal to the fifth threshold and is less than or equal to the sixth threshold.

5. The method according to claim 1, wherein the first terminal device uses the centralized scheduling transmission mode or uses the distributed transmission mode.

6. The method according to claim 1, wherein after the sending, by the first terminal device, the report information to the network device, the method further comprises:
   receiving, by the first terminal device, resource scheduling information sent by the network device, wherein the resource scheduling information is generated based on the report information, and the resource scheduling information comprises information resource units in the transmission resource set that are allocated to the first terminal device.

7. The direct link data transmission method according to claim 1, wherein the transmission resource set includes a plurality of resource units, wherein each of the plurality of resource units is available to either the second terminal device or the third terminal device, but not to both the second terminal device and the third terminal device.

8. A direct link data transmission method, comprising:
   sending, by a network device, first configuration information to a first terminal device, wherein the first configuration information comprises information about a transmission resource set shared between a second terminal device that uses a centralized scheduling transmission mode and a third terminal device that uses a distributed transmission mode, wherein the first configuration information further comprises a first threshold and a second threshold; and
   receiving, by the network device, report information sent by the first terminal device when a load level is greater than or equal to the first threshold and less than or equal to the second threshold, wherein the load level comprises a ratio of occupied resource units in the transmission resource set to all resource units in the transmission resource set, wherein the report information comprises information about one or more occupied resource units and/or information about one or more available resource units in the transmission resource set.

9. The method according to claim 8, wherein the first configuration information further comprises one or more of a third threshold M or a fourth threshold T, M being less than or equal to T;
   wherein the information about the one or more available resource units in the report information is information about K available resource units, wherein
   K is less than or equal to M, or
   K is greater than or equal to T, or
   K is greater than or equal to M and is less than or equal to T.

10. The method according to claim 8, wherein the method further comprises:
    sending, by the network device, second configuration information to the first terminal device, wherein the second configuration information comprises one or more of a fifth threshold or a sixth threshold, the fifth threshold being less than or equal to the sixth threshold, and wherein one or more of the fifth threshold or the sixth threshold are used for the first terminal device to determine to start to detect the load level of the transmission resource set.

11. The method according to claim 8, wherein the load level comprises:
    a load level of a resource unit used by the third terminal device in the transmission resource set; or
    a load level of a resource unit used by the second terminal device and the third terminal device in the transmission resource set.

12. The method according to claim 8, wherein the first terminal device uses the centralized scheduling transmission mode or uses the distributed transmission mode.

13. The method according to claim 8, wherein after the receiving, by the network device, the report information sent by the first terminal device, the method further comprises:
    sending, by the network device, resource scheduling information to the first terminal device, wherein the resource scheduling information is generated based on the report information, and the resource scheduling information comprises information about resource units information in the transmission resource set that are allocated to the first terminal device.

14. The direct link data transmission method according to claim 8, wherein the transmission resource set includes a plurality of resource units, wherein each of the plurality of resource units is available to either the second terminal device or the third terminal device, but not to both the second terminal device and the third terminal device.

15. A first terminal device, comprising:
a processor; and
a memory;
wherein the memory is coupled to the processor and configured to store program instructions, which, when executed by the processor, cause the first terminal device to perform operations comprising;
receiving first configuration information sent by a network device, wherein the first configuration information comprises information about a transmission resource set shared between a second terminal device that uses a centralized scheduling transmission mode and a third terminal device that uses a distributed transmission mode, wherein the first configuration information further comprises a first threshold and a second threshold;
detecting a load level of the transmission resource set based on the information about the transmission resource set, wherein the load level comprises a ratio of occupied resource units in the transmission resource set to all resource units in the transmission resource set; and
sending report information to the network device when the load level is greater than or equal to the first threshold and less than or equal to the second threshold, wherein the report information comprises information about one or more occupied resource units and/or information about one or more available resource units in the transmission resource set.

16. The first terminal device according to claim 15, wherein the load level comprises:
a load level of a resource unit used by the third terminal device in the transmission resource set; or
a load level of a resource unit used by the second terminal device and the third terminal device in the transmission resource set.

17. The first terminal device according to claim 15, wherein the first configuration information further comprises one or more of a third threshold M or a fourth threshold T, M being less than or equal to T; and wherein the processor is further configured to: determine K available resource units in the transmission resource set, wherein K is less than or equal to M; or
determine K available resource units in the transmission resource set, wherein K is greater than or equal to T; or
determine K available resource units in the transmission resource set, wherein K is greater than or equal to M and is less than or equal to T; and
wherein the information about the one or more available resource unit in the report information includes information about the K available resource units.

18. The first terminal device according to claim 15, wherein the operations further comprise:
wherein before the detecting of the load level of the transmission resource set, receiving second configuration information sent by the network device, wherein the second configuration information comprises one or more of a fifth threshold or a sixth threshold, the fifth threshold being less than or equal to the sixth threshold; and
detecting the load level when detected signal quality of the network device is less than or equal to the fifth threshold, or
detecting the load level when the detected signal quality of the network device is greater than or equal to the sixth threshold, or
detecting the load level when the detected signal quality of the network device is greater than or equal to the fifth threshold and is less than or equal to the sixth threshold.

19. The first terminal device according to claim 15, wherein the terminal device uses the centralized scheduling transmission mode or uses the distributed transmission mode.

20. The first terminal device according to claim 15, wherein the operations further comprise:
receiving resource scheduling information sent by the network device, wherein the resource scheduling information is generated based on the report information, and the resource scheduling information comprises information resource units in the transmission resource set that are allocated to the first terminal device.

* * * * *